United States Patent [19]
Boutet

[11] Patent Number: 5,221,840
[45] Date of Patent: Jun. 22, 1993

[54] DIFFUSE LIGHT COLLECTOR

[75] Inventor: John C. Boutet, Rochester, N.Y.

[73] Assignee: Eastman Kodak Company, Rochester, N.Y.

[21] Appl. No.: 733,798

[22] Filed: Jul. 22, 1991

[51] Int. Cl.$^5$ .................................... G01J 1/42
[52] U.S. Cl. .................................... 250/228; 356/236
[58] Field of Search ............... 356/236, 446, 429–431; 250/236, 228

[56] References Cited

U.S. PATENT DOCUMENTS

| | | |
|---|---|---|
| 2,821,103 | 1/1958 | Blet . |
| 3,327,583 | 6/1967 | Vanderschmidt et al. . |
| 3,648,056 | 3/1972 | Buttweiler et al. ............... 250/239 |
| 4,568,984 | 2/1986 | Juergensen et al. ............. 358/293 |
| 4,583,860 | 4/1986 | Butner ............................ 356/446 |
| 4,818,861 | 4/1989 | Horiuchi et al. ................ 250/235 |
| 4,868,383 | 9/1989 | Kurtz et al. ..................... 250/228 |
| 5,068,739 | 11/1991 | Filo ................................ 356/236 |

Primary Examiner—David C. Nelms
Assistant Examiner—K. P. Hantis
Attorney, Agent, or Firm—Willaim F. Noval

[57] ABSTRACT

Apparatus for scanning an information medium, such as laser scanning apparatus, includes a light collector which has high light collection efficiency, which is easy and economical to manufacture, and which efficiently shades photodetectors from scattered transmitted light. The collector includes first and second members joined together to form a light collecting cavity, with diffusely reflecting surfaces facing the cavity. The members extend the length of the scanning region and are formed from longer lengths of extrudable material. The members have ends which form a slot adjacent to the light scanning region for receiving light transmitted through the information medium into the collection cavity and which have information medium guiding features. The second member has a recessed channel, extending the length thereof, for mounting photodetector(s) and has light baffle segments at the mouth of the recess to prevent light received into the cavity through the collector slot from directly impinging on the mounted photodetectors and to prevent light singly reflected within the cavity from impinging on the photodetectors. Thus, only diffusely reflected light is detected by the photodetectors.

6 Claims, 4 Drawing Sheets

006

DIFFUSE LIGHT COLLECTOR

FIELD OF INVENTION

This invention relates in general to apparatus for scanning an information medium and more particularly to laser scanning apparatus including a light collector which has high light collection efficiency, which is easy and economical to manufacture, and which efficiently shades photodetectors from directly transmitted light.

BACKGROUND OF THE INVENTION

In conventional film/screen radiography, an x-ray image is formed on film by exposing an object (such as a patient body part) to a source of x-rays. The developed film is then used by a physician for diagnostic purposes. In order to facilitate computer processing of an x-ray image on film, the film is digitally scanned to produce a digital x-ray image. The digital image can be processed, stored, transmitted to remote locations and displayed on a video monitor. One type of digital film scanner uses a laser to produce a laser beam which is scanned in a line across an information medium, such as radiographic film, as the medium is translated in a direction perpendicular to the line scan direction. Light transmitted or reflected from the film is collected and converted to an electrical image signal by a photodetector.

Laser film scanners are disclosed in U.S. Pat. No. 4,818,861, issued Apr. 4, 1989, inventors Horiuche et al. and U.S. Pat. No. 4,568,984, issued Feb. 4, 1986, inventors Juergensen et al. The latter patent discloses the use of a cylindrical diffuse light collector located below a horizontally translated film which is scanned with a laser beam. The collector has a slot for receiving transmitted light into the collector cavity where the light is diffusely reflected to a photodetector by means of a fiber optic bundle. Such a collector is disadvantageous since dirt can enter the collector cavity through the light collecting slot and accumulate at the bottom of the collector cavity to cause streak artifacts. Moreover, the use of fiber optic bundles is expensive and disadvantageous to manufacture.

U.S. Pat. No. 2,821,103, issued Jan. 28, 1958, inventor G. C. F. Blet; U.S. Pat. No. 3,327,583, issued Jun. 27, 1967, inventors G. F. Vanderschmidt et al.; U.S. Pat. 3,648,056, issued Mar. 7, 1972, inventors T. B. Buttweiler et al.; U.S. Pat. No. 4,583,860, issued Apr. 22, 1986, inventor C. L. Butner; U.S. Pat. No. 4,868,383, issued Sep. 19, 1989, inventors A. F. Kurtz et al., disclose various configurations of light collecting and transmitting spheres and cylinders which do not solve these problems.

It is thus desirable that such streak artifacts be eliminated. It is also desirable that the light collector have high light collection efficiency, be easy and economical to manufacture and be configured so that photodetectors are shaded from scattered transmitted light.

SUMMARY OF THE INVENTION

According to the present invention, there is provided a diffuse light collector for a laser film scanner which has high light collection efficiency, which is economical and easy to manufacture and which blocks scattered transmitted light or once reflected light from photodetectors.

According to an aspect of the present invention, a diffuse light collector is provided having an internal cavity configuration which prevents light which enters the cavity from directly striking photodetectors communicating with the cavity. Also, once reflected light is prevented from striking the detector directly.

According to another aspect of the present invention, a diffuse light collector is provided which is formed from two extrudable pieces. The collector incorporates light baffle features, film guide features and mounting features to affix electrical components to the collector and to mount the collector to a film scanner.

DESCRIPTION OF THE PREFERRED EMBODIMENTS

Figure 1:
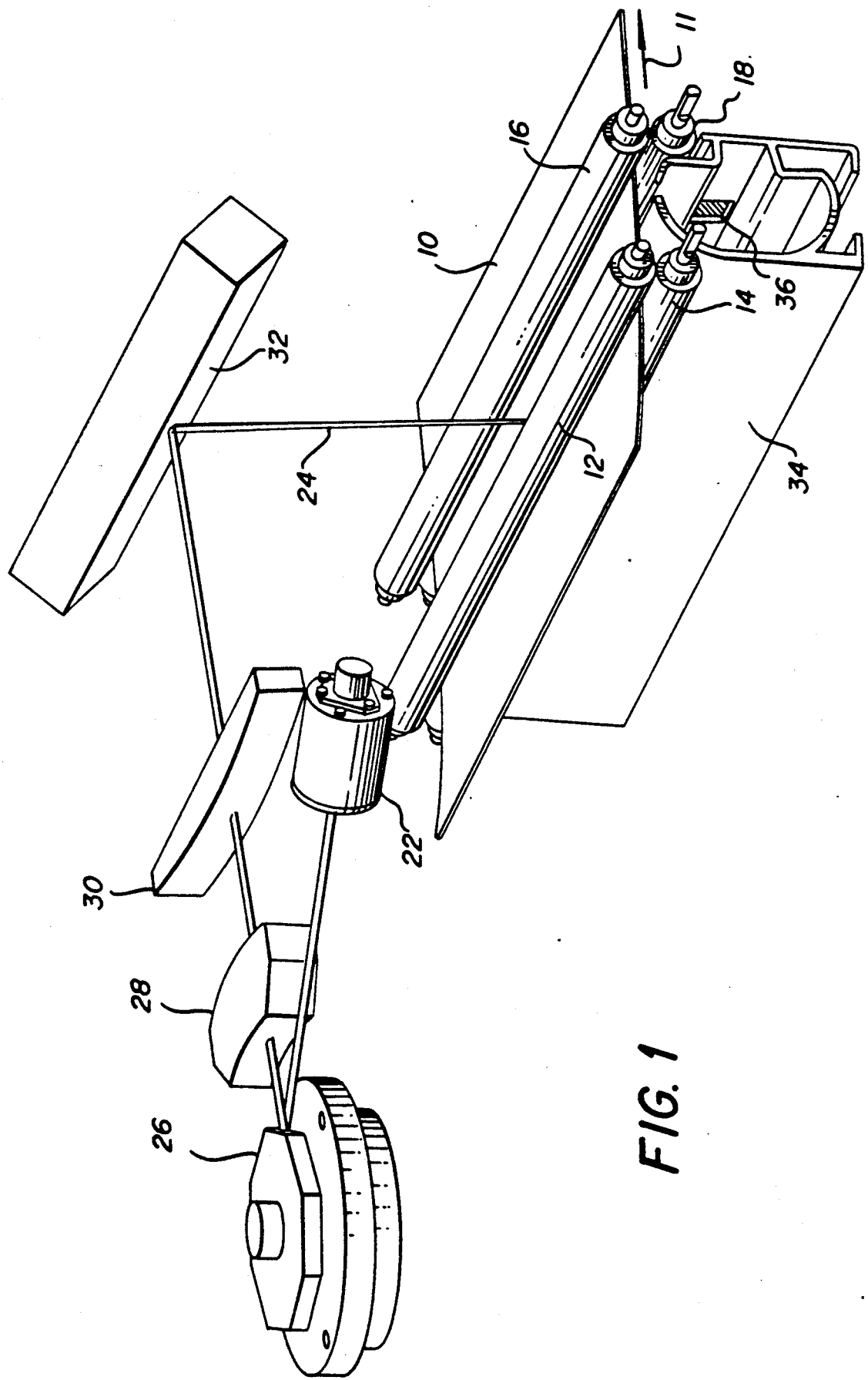
FIG. 1 is a perspective view of laser scanning apparatus, including an embodiment of the collector of the present invention.
Figure 2:
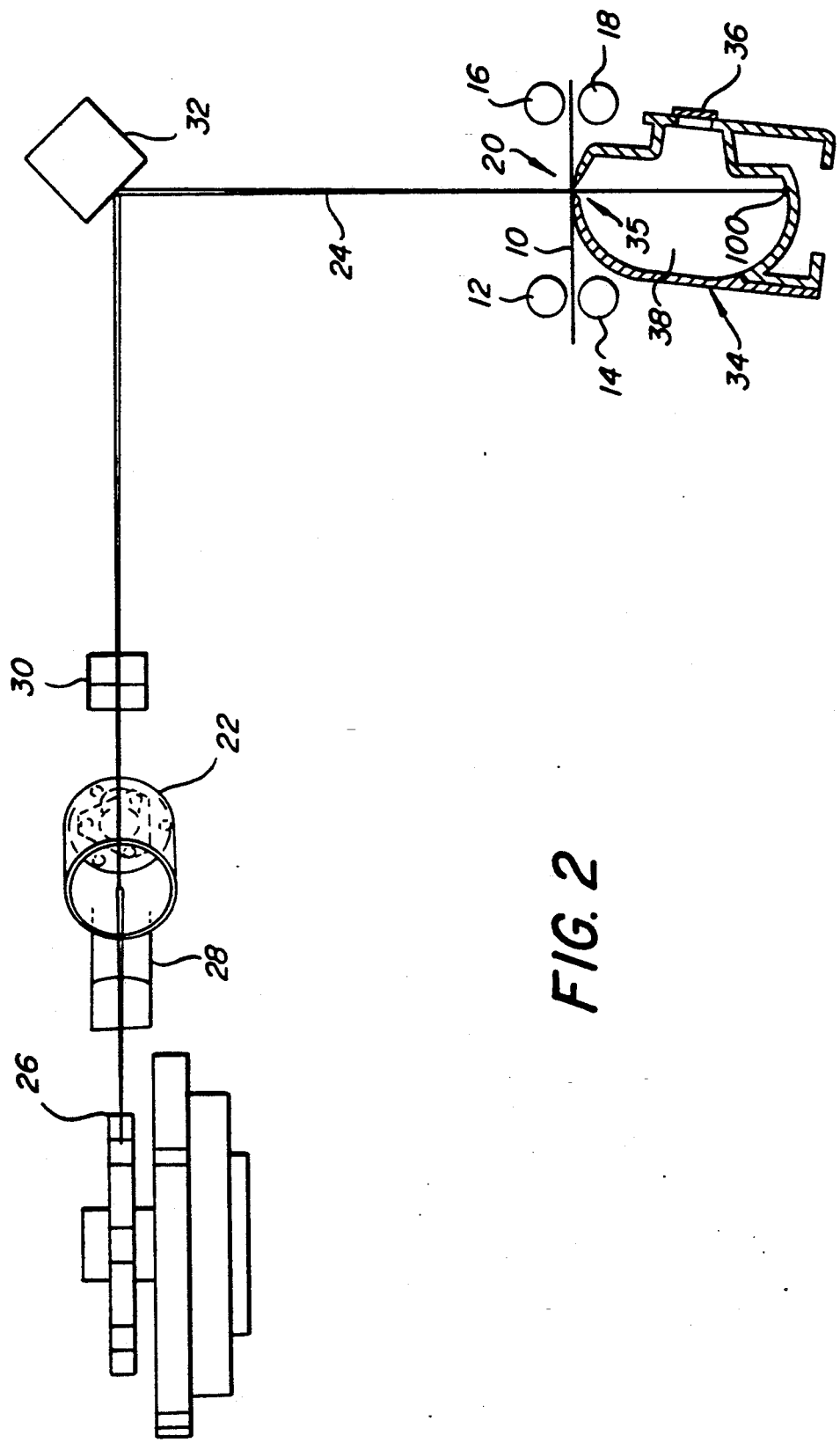
FIG. 2 is a side elevational view of the apparatus of FIG. 1.

Referring now to FIGS. 1 and 2, there is shown laser scanning apparatus, including an embodiment of the present invention. As shown, film 10 is moved in a substantially horizontal direction by means of roller pairs 12, 14, and 16, 18 past a laser beam scanning and light collection station 20. A laser 22 produces a laser beam 24, which is scanned across the width of film 10 in a scanning line direction by means of rotating polygon mirror 26, scan optic elements 28 and 30, and mirror 32. Scan optic elements 28 and 30 shape the laser beam to a desired size and shape and correct for Fθ distortion as the beam is scanned across film 10. Laser 22 may, for example, be a gas laser (such as a helium-neon laser, argon laser) or may be a solid state laser (such as a semi-conductor laser emitting light in the infra red or near red wavelengths).

As film 10 is moved in direction 11, laser beam 24 is scanned across an image on film 10 in a raster. Light transmitted through film 10 is collected by means of a diffuse light collector 34, and detected by one or more photodetectors 36 communicating with the light collection cavity 38 of collector 34. According to the present invention, collector 34 is a diffuse light collector for transmitted light, which has a high light collection efficiency, which is economical and easy to manufacture, and which blocks scattered transmitted light or once reflected light from impinging on photodetectors 36.

Figure 3:
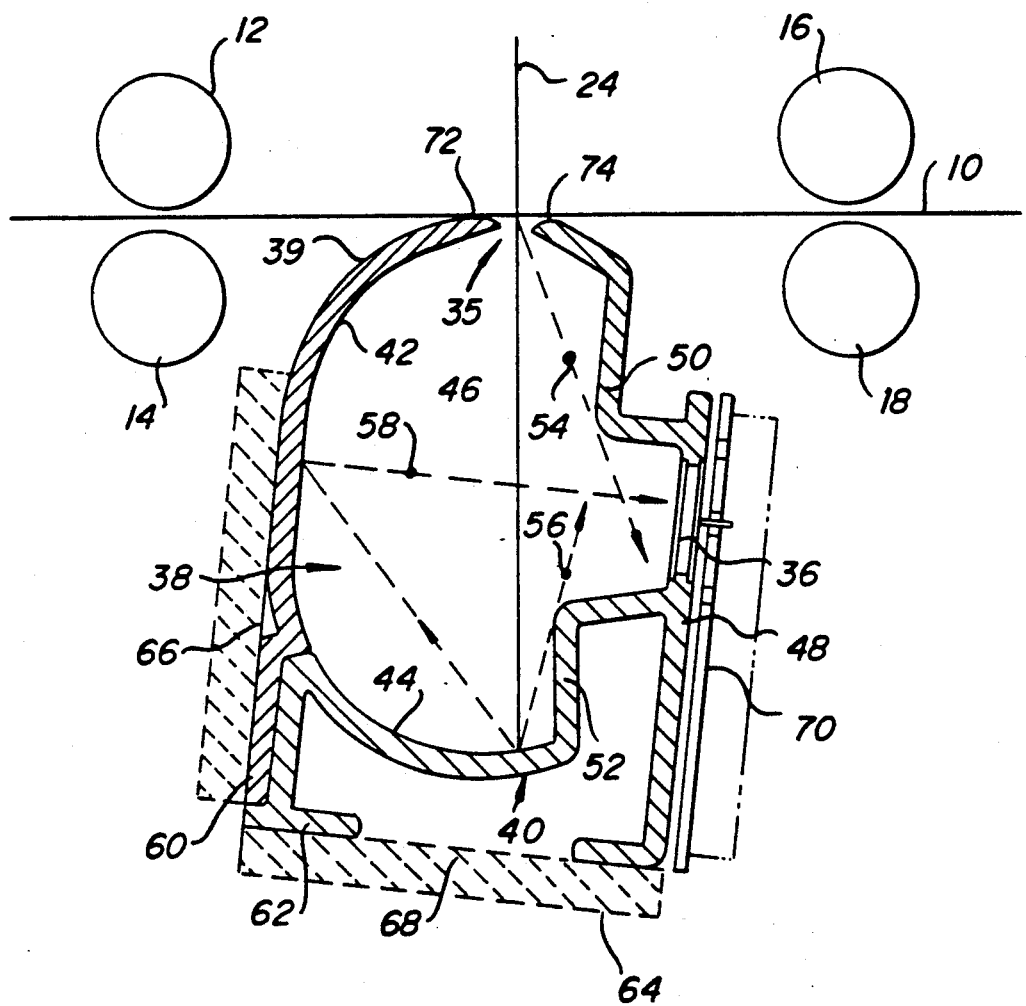
FIG. 3 is an elevational view of the collector of FIG. 1.

As shown in greater detail in FIG. 3, collector 34 includes elongated members 39 and 40 which are joined together to form cavity 38. The respective interior surfaces 42 and 44 of members 39 and 40 are of diffusely reflective material so that light 46 transmitted through film 10 is reflected several times before reaching photodetector 36. Member 40 includes a recessed segment 48 which mounts photodetector(s) 36. Baffle segments 50 and 52 of member 40 prevent scattered transmitted light 54 from impinging directly on photodetector 36. Segments 50, 52 extend the length of 34. This is illustrated in FIG. 3. Whereas scattered directly transmitted light ray 54 is blocked by baffle segment 50 and first reflected light ray 56 is blocked by baffle segment 52, doubly reflected light ray 58 reaches photodetector 36. Light ray 58 is more diffusely reflected than scattered transmitted light ray 54 and singly reflected light ray 56 to provide a more even collector signature.

Members 39 and 40 are provided with respective extensions 60, 62 and 64 which are used for mounting collector 34 to frame members 66 and/or 68 of a laser imaging apparatus, and for mounting printed circuit board 70 to extension 64 of member 40. Board 70 supports electronic circuitry for photodetector 36.

Members 38 and 40 are formed of extrudable material, such as aluminum. Individual lengths of material are severed from longer lengths of extruded aluminum material. Thus the collector 34 is economical and easy to manufacture.

The upper ends 72 and 74, respectively, of members 39 and 40 of collector 34, form slot 35 for collecting transmitted light from film 10. The outer faces of ends 72 and 74 are arcuate in shape to provide film guiding in the region of slot 35 so that film 10 is scanned in a flat region for effective image detection.

Figure 4:
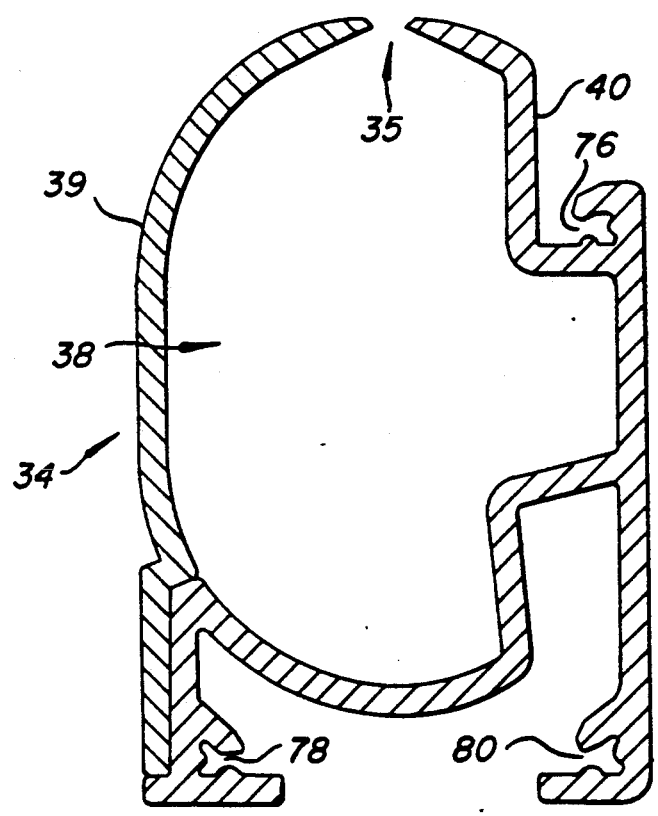
FIG. 4 is a sectional, elevational view of another embodiment of the collector of the present invention.

Referring now to FIG. 4, there is shown another embodiment of the collector of the present invention. As shown in FIG. 4, extrudable slots 76, 78 and 80 in member 40 permit the screwing of end caps to members 39, 40 by the use of self-tapping screws, thereby eliminating the need to drill end tap holes in the ends of the collector members 39 and 40.

Industrial Applicability and Advantage

The light collector of the present invention has industrial applicability in laser scanning apparatus, such as radiographic film digitizers. The diffuse light collector of the present invention has high light collection efficiency, is economical and easy to manufacture, blocks scattered transmitted light or once reflected light from impinging on light collecting photodetectors and has surfaces for guiding film to effect efficient image scanning.

What is claimed is:

1. In a light scanning apparatus, including means for scanning a beam of light across a scanning region and means for translating an information medium through said scanning region, a diffuse light collector located adjacent to said region for receiving light transmitted through said information medium, said collector comprising, first and second elongated members joined together to form a light collecting cavity, with diffusely reflecting surfaces facing said cavity;

wherein said members extend the length of said scanning region and are formed from longer lengths of extruded material;

wherein said members have ends which form a slot adjacent to said light scanning region for receiving light transmitted through said information medium into said cavity and which have information medium guiding regions for maintaining said medium flat across said slot; and wherein said second member has a recessed channel, extending the length thereof, for mounting one or more photodetectors and has light baffle segments at the mouth of said recess to prevent light received into said cavity through said collector slot and light singly reflected within said cavity from directly impinging on said mounted photodetector but allowing twice reflected light to reach said photodetector so that only diffusely reflected light is detected by said photodetector.

2. The collector of claim 1 wherein said collector members include extensions for mounting said collector on supporting members.

3. The collector of claim 2 wherein said extensions include extruded grooves for receiving at the ends thereof self-tapping screws for mounting end caps at the ends of said members.

4. A laser scanning apparatus comprising means for scanning a laser beam across a scanning region, means for translating an information medium through said scanning region, a diffuse light collector located adjacent to said scanning region for receiving light transmitted through said information medium, said collector comprising:

first and second elongated members joined together to form a light collecting cavity, with diffusely reflecting surfaces facing said cavity;

wherein said members extend the length of said scanning region and are formed from longer lengths of extruded material;

wherein said members have ends which form a slot adjacent to said laser scanning region for receiving light transmitted through said information medium into said cavity and which have information medium guiding regions to maintain said medium flat across said slot; and wherein said second member has a recessed channel, extending the length thereof, for mounting a photodetector, said channel having light baffle segments at the mouth of said recess to prevent light received into said cavity through said collector slot and light singly reflected within said cavity from directly impinging on said mounted photodetector, but allowing twice reflected light to reach said photodetector so that only diffusely reflected light is detected by said photodetector.

5. The collector of claim 4, wherein said collector members include extensions for mounting said collector on supporting members.

6. The collector of claim 5, wherein said extensions include extruded grooves for receiving at the ends thereof self-tapping screws for mounting end caps at the ends of said members.

* * * * *